United States Patent [19]

Elliott et al.

[11] 4,379,522
[45] Apr. 12, 1983

[54] FOLDING SPRAY BOOM ASSEMBLY

[75] Inventors: Marion D. Elliott, Woodward; Wendell D. Reece, Ankeny, both of Iowa

[73] Assignee: Deere & Company, Moline, Ill.

[21] Appl. No.: 253,494

[22] Filed: Apr. 13, 1981

[51] Int. Cl.³ ............................................. B05B 1/20
[52] U.S. Cl. .................................................. 239/167
[58] Field of Search ....................... 239/159, 164–168, 239/172

[56]  References Cited
U.S. PATENT DOCUMENTS 3,904,118 9/1975 Farmery ............................... 239/165

FOREIGN PATENT DOCUMENTS 1052094 12/1966 United Kingdom ................ 239/166

Primary Examiner—Andres Kashnikow

[57] ABSTRACT

A folding spray boom assembly includes an outer boom pivotally connected by hinge structure to an inner boom which is carried by support structure on an agricultural sprayer. An upper support rod is connected to the support structure and to the outer boom at a position offset from the pivotal axis of the hinge to arm, in effect, an over center device utilizing the tension in the support rod to maintain the spray boom assembly in its respective folded or unfolded positions without a latch or retaining pin. Relocating the support rod on the outer boom relieves stresses on the hinge when the boom assembly is in the unfolded position.

15 Claims, 4 Drawing Figures

FOLDING SPRAY BOOM ASSEMBLY

BACKGROUND OF THE INVENTION

The present invention relates generally to agricultural sprayers and more specifically to a folding spray boom assembly for such sprayers.

Agricultural sprayers having long, folding spray boom assemblies are well known and are capable of spraying very large areas in a short period of time. Typically, the folding boom assemblies are carried on a boom support frame on the sprayer vehicle and include an inner boom, and an outer boom which is hinged to the inner boom and can be pivoted about a generally vertical axis from the extended spraying position to a folded position for reducing the transport width of the sprayer. An upper support rod or cable or the like is tensioned between the outboard end of the inner boom and the boom support frame on the vehicle to support and stabilize the entire boom assembly in a substantially horizontal position above the ground. With this arrangement of the support rod or cable, the hinges connecting the booms must be strong enough to transfer the forces required from the outer to the inner boom to maintain the outer boom in a horizontal attitude. The length and weight of the outer boom, and jolting and rocking to which the boom assembly is subjected as the sprayer moves over rough terrain, results in a high amount of stress on the hinges.

A latch or retaining pin is required to hold the boom assembly in the unfolded or extended position. Often the operator has difficulty unfolding the outer boom to the exact position wherein the latch or pin can be operated or inserted to lock the boom in the extended position. Once the outer boom is locked in the extended position, it can no longer pivot away from an obstacle while the sprayer is in motion and the boom assembly can be easily damaged.

It is, therefore, an object of the present invention to provide an improved folding boom assembly for a sprayer.

It is another object of the present invention to provide an improved folding boom assembly for a sprayer wherein the stresses in the hinge area are reduced.

It is still another object of the present invention to provide a folding boom assembly with an improved support structure which reduces stresses in the assembly and which automatically holds the assembly in the extended position without need for a latch or retaining pin. It is another object to provide an assembly, which, when the operator wishes to lock to outer boom in the extended position, allows easy and quick locking without need to use force on the boom assembly to align the latch or pin.

It is still a further object of the invention to provide a folding boom assembly with an outer boom pivoted to an inner boom wherein the outer boom is free to pivot from the extended working position to avoid damage if it encounters an obstacle while being moved forwardly over a field.

It is yet another object of the invention to provide a folding boom assembly with a unique hinge and support arrangement which automatically biases the assembly toward the extended position when the boom is in or is approaching the extended position. It is a further object of the invention to provide such an assembly wherein the boom is biased toward the folded position when the boom is in or approaching the folded position.

It is still another object of the invention to provide an improved folding boom assembly wherein the upper tension link which supports the boom horizontally above the ground is advantageously utilized to both reduce stress in the hinge area between booms and to provide an overcenter arrangement which biases the outer boom toward the folded or unfolded position when the outer boom is in or is approaching the respective positions. It is a further object to provide such a boom assembly which will easily accommodate a hydraulic boom-folding mechanism.

In accordance with the above objects, an inner boom is connected to a support frame on a mobile sprayer and extends generally horizontally outwardly therefrom to an outermost end. An outer boom includes an inboard end hinged to the outermost end of the inner boom for swinging about an upright pivotal axis between an unfolded position wherein the booms are generally axially aligned, and a folded position wherein the booms are generally adjacent and parallel to each other. Hinge structure connecting the booms includes complementary inner and outer A-frames connected to the respective booms and having an adjacent pair of legs pivotally connected to define the upright pivotal axis forming an acute angle with respect to a transverse vertical plane. An upper elongated support rod is tensioned between the outer A-frame and the support frame to support the booms above the ground. The outer end of the rod is connected to the A-frame at a position radially offset from the axis so that the rod and hinge structure provide an overcenter device which acts to bias the outer boom to the final unfolded position as it approaches that position. Since the pivotal axis is angled with respect to the vertical, the end of the outer boom will be lifted as the outer boom is swung from its folded or unfolded position. This angle, as well as the radial offset provided between the rod connection and the pivotal axis, help determine the force necessary to move the outer boom from the folded or unfolded positions. Because the rod is connected to the outer boom, stresses across the hinge structure are reduced while the outer boom is unfolded. No latch or pin is necessary to hold the outer boom in either position as a result of the overcenter device.

These and other objects, features and advantages of the invention will become apparent from the description of the preferred embodiment which follows taken in connection with the accompanying drawings.

DESCRIPTION OF THE PREFERRED EMBODIMENT

Figure 1:
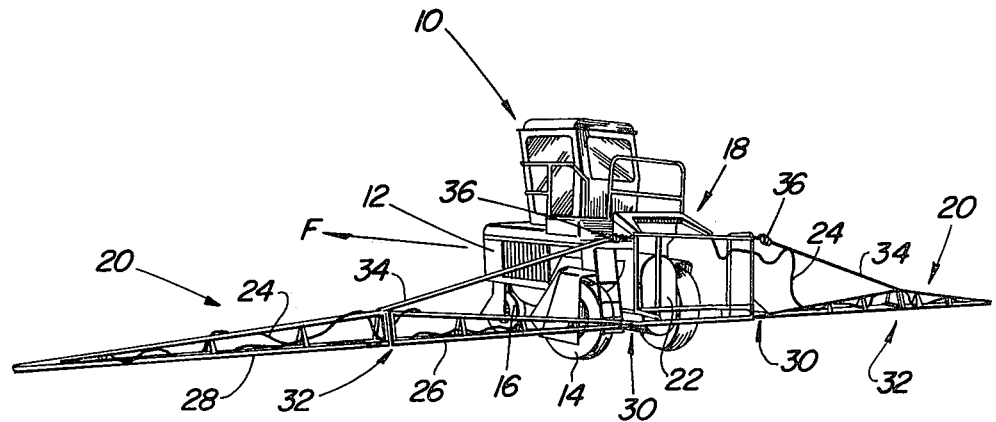
FIG. 1 is a rear perspective view of a mobile sprayer with the boom assembly of the present invention attached and in the unfolded or field-working position.

Referring to FIG. 1 therein is shown an agricultural sprayer 10 including a mobile frame 12 supported for movement in the forward direction over a field by rear drive wheels 14 and a front steerable wheel 16. Connected to the rear of the mobile frame 12 is an upright boom support frame 18. Left- and right-hand boom assemblies 20 are carried by the lower portion of the frame 18 and support spray nozzles (not shown) which are supplied with liquid from a tank 22 through hoses 24.

Each boom assembly 20 includes an inner boom 26 and an outer boom 28. The inner boom 26 has an inboard end conventionally hinged to the support frame at 30 and extends transversely outwardly as shown in FIG. 1 when the boom assembly 20 is in the field-working position. The outer boom 28 includes an inboard end pivotally connected by hinge structure 32 to the outboard end of the inner boom 26. An elongated support member or rod 34 is tensioned between the upper portion of the support frame 18 and the hinge structure 32 to maintain the boom assembly 20 in a generally horizontal attitude above the ground. Shock absorbing connecting members 36 may be connected between the rod 34 and the frame 18 to lessen shock loading when the sprayer is traveling over rough terrain.

Figure 2:
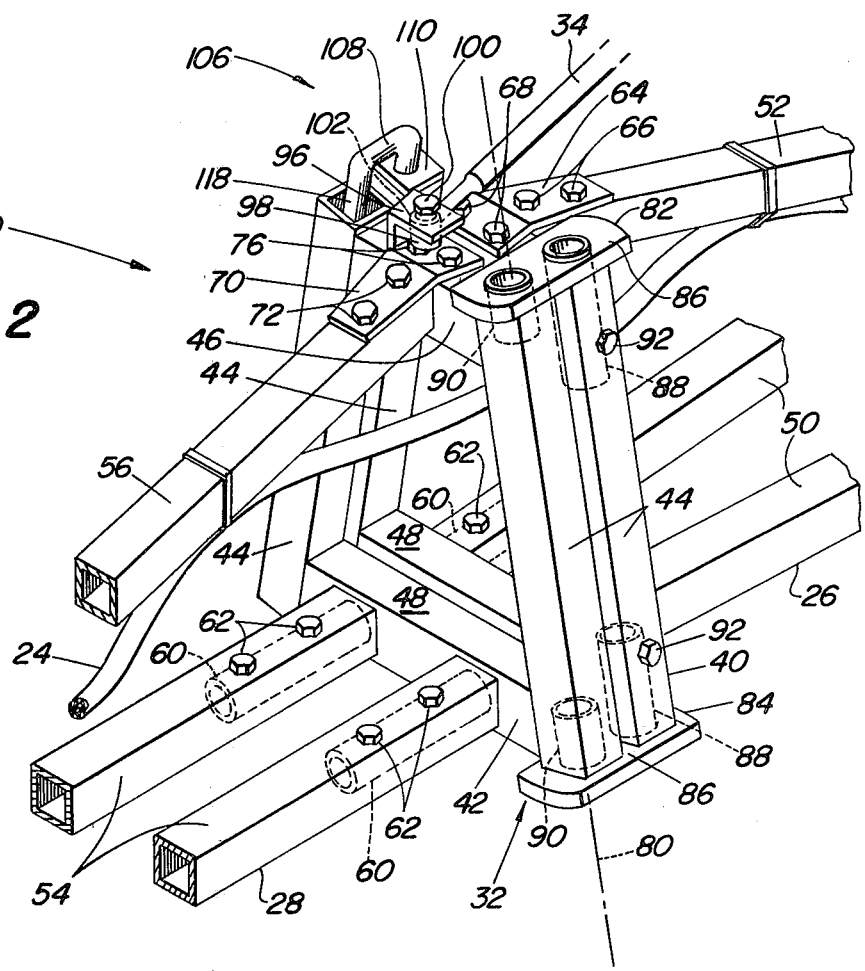
FIG. 2 is a rear perspective view of the hinge structure for the boom assembly of FIG. 1, with the assembly in the unfolded or field-working position.
Figures 3, 4:
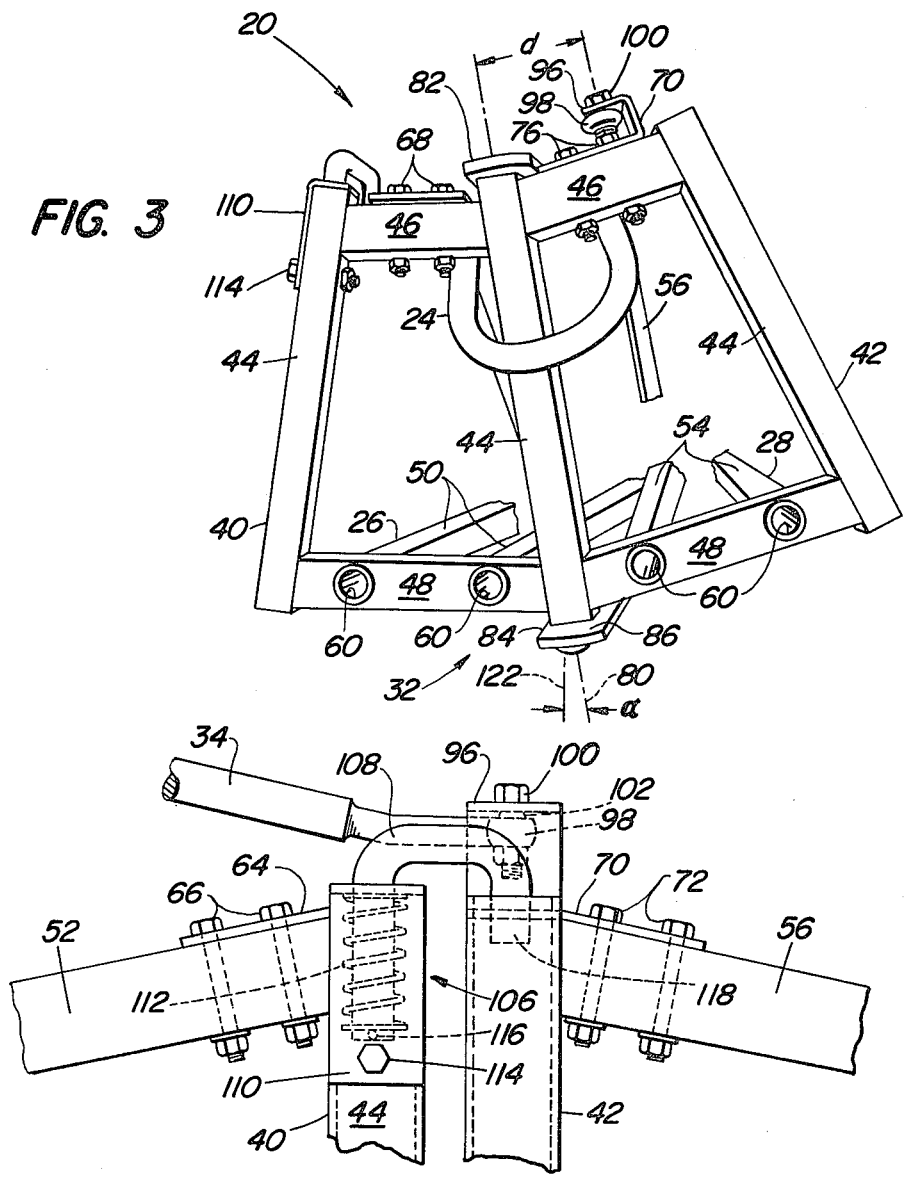
FIG. 3 is an end view of the structure shown in FIG. 2, but with the assembly in the folded or transport position.
FIG. 4 is an enlarged front view of a portion of the structure of FIG. 2 and showing the locking pin in position.

As best seen in FIGS. 2 and 3, the hinge structure 32 includes a pair of complementary inner and outer end frame structure 40 and 42, each having a generally A-shaped configuration with upwardly converging upright sidelegs 44. The sidelegs 44 are spaced fore-and-aft by upper and lower horizontal connecting portions 46 and 48, respectively. The sidelegs 44 and connecting portions 46 and 48 preferably are fabricated from square tubular metal stock and are connected such as by welding.

The inner boom 26 includes a pair of lower structural tubes 50 connected at their outboard ends to the lower connecting portion 48 of the inner frame structure 40 of the hinge, and an upper brace tube 52 connected to the upper connecting portion 46. Similarly, the outer boom 28 includes a pair of lower structural tubes 54 connected at their inboard ends to the lower connecting portion 48 of the outer frame structure 42, and an upper brace tube 56 connected to the upper connecting portion 46. The lower structural tubes 50 and 54 are square in cross-section and are positioned over round tubular connectors 60 which extend transversely from, and are welded to, the corresponding lower connecting portions 48. Cap screws 62 (FIG. 2) are inserted through holes in the tubes and tubular connectors. A flat support bracket 64 is connected by cap screws 66 to the inner brace tube 52 and to the upper connecting portion 46 by screws 68. A support strap 70 is connected by cap screws 72 to the outer brace tube 56 and to the upper connecting portion 46 by cap screws 76.

The inner and outer end frame structures 40 and 42 of the hinge structure 32 are connected for relative pivotal movement about an upright axis 80 by upper and lower pivot assemblies 82 and 84, respectively. Each pivot assembly includes a plate 86 (FIG. 2) to which are welded transversely spaced round tubular members 88 and 90. The tubular members 88 are inserted into the respective upper and lower ends of the rear sideleg 44 of the inner frame structure 40. Cap screws 92 hold the pivot assemblies 82 and 84 rigidly with respect to the structure 40 with the tubular members 90 held transversely outwardly of the inner frame sideleg 44 and extending into the ends of the rear sideleg 44 of the outer frame structure 42. The axes of the members 90 are held in general alignment with each other by the plates 86 and correspond to the pivotal axis 80 of the hinge structure 32. The outer frame structure 42 with the boom 28 is free to pivot about the members 90 between a field-working or unfolded position (FIGS. 1 and 2) wherein the frame structures abut against each other, and a 180 degree rearwardly folded or transport position (FIG. 3) wherein the outer boom 28 extends inwardly from the hinge structure 32 directly alongside and behind the inner boom 26.

The support strap 70 includes an upper angle 96 supported generally centrally above the upper connecting portion 46 of the outer frame structure 42. The support member or rod 34 has an outermost end with an eye 98 connected to the angle 96 by a cap screw 100 and a spacer 102. The eye 98 is offset a distance d (FIG. 3) from the pivotal axis 80 of the hinge structure 32. The pivotal axis 80 is inclined forwardly in the upward direction at and angle $\alpha$ with respect to the vertical.

A boom lock assembly 106 is provided to selectively lock the outer boom 28 in the unfolded position (FIGS. 2 and 4). The assembly 106 includes a U-shaped latch 108 pivotally supported and downwardly spring-loaded in the forward sideleg 44 of the inner frame structure 40 by an angle support 110 and a spring assembly 112. The support 110 is connected to the sideleg by a cap screw 114 (FIG. 4) and the spring assembly 112 is compressed between a pin 116 and the top of the support 110 to maintain end 118 of the latch 108, when in the locking position, in the upper end of the corresponding sideleg 44 of the outer frame structure 42.

It is to be understood that although a latch assembly 106 is provided, the outer boom 28 will remain in the unfolded position without placement of the latch 108 in the locking position shown In FIGS. 2 and 4 because the tension in the rod 34 biases the outer frame structure 42 toward the inner frame structure 40 (FIG. 2) when the outer boom 28 is in or approaching the unfolded position. The off-axis connection of the rod end 98 with the outer frame structure 42 provides an overcenter device which not only biases the outer boom 26 toward the unfolded position when the boom is in or approaching that position, but which also biases the outer boom toward the folded position (FIG. 3) when the boom is in or approaching the folded position. The overcenter device biases the outer boom 28 toward the unfolded position whenever the boom is unfolded beyond a predetermined intermediate position wherein the axis of the rod 34 intersects the pivotal axis 80. The outer boom 28 is biased toward the folded position when the boom is folded beyond the intermediate position.

Connection of the rod 34 to the outer frame structure 42 reduces the stresses across the hinge structure 32 when the boom assembly 20 is in the unfolded position (FIG. 2) compared to a structure where the rod is connected to the inner boom. The tension in the rod 32 as it supports both the inner and outer booms 26 and 28 above the ground is advantageously utilized to maintain the adjacent faces of the inner and outer frames 40 and 42 in contact with the each other and to reduce the loading on the upper and lower pivot assemblies 82 and 84 when the boom assembly 20 is in the field-working position. With the latch 108 in the unlocked position, the outer boom 28 can pivot rearwardly if it hits the ground or other obstacle, and once the obstacle is cleared the boom will automatically return to its field-working position.

The forces required to move the outer boom 28 toward or away from its folded or unfolded positions are determined in part by the distance d (FIG. 3) of the rod eye 98 from the pivotal axis 80 and by the angle of inclination α between the pivotal axis 80 and a vertical line 122 intersecting the axis. The larger the angle α, the farther the outer end of the boom 28 will be raised with respect to the hinge end of the boom when it is swung from either the folded or unfolded position. The larger the distance d, the farther the outer end of the inner boom 26 will be raised with respect to the end of the boom connected to the frame structure 18 as the outer boom 28 is pivoted away from either position. Increasing the distance d also increases the lever arm through which the tension in the rod 34 acts to bias the outer boom 28 toward its final position as it approaches that position. In the preferred embodiment, each of the booms 26 and 28 is about 12½ feet long, the distance d is approximately half the distance between the upper ends of the frame structure 42 or about four inches, and the angle α is an acute angle of about eight degrees. The support rod 34 is angled upwardly from the horizontal approximately nine degrees. These dimensions and angles are given as an example only and it is to be understood that other configurations may be utilized equally as well.

Having described the preferred embodiment, it will be apparent that modifications can be made without departing from the scope of the invention as defined in the accompanying claims.

We claim:

1. In a mobile sprayer adapted for forward movement over a field and having a support frame, a spray boom assembly comprising:
   an inner boom and an outer boom, each said boom having inboard and outboard ends;
   means for mounting the inboard end of the inner boom on the boom support frame;
   hinge means pivotally connecting the outboard end of the inner boom to the inboard end of the outer boom for rocking outer boom with respect to the inner boom generally horizontally about a substantially upright axis between preselected positions including a generally outwardly extending, unfolded position and an inwardly extending, folded position;
   elongated support means extending above the inner boom connected to the outer boom adjacent the hinge means and to the support frame and tensioned therebetween for providing vertical stability to the inner and outer booms when the latter is in either its folded or unfolded position; and
   overcenter means connecting the support means to the outer boom for biasing the outer boom towards the unfolded position when it is within a range of positions between the unfolded position and an intermediate position between said folded and unfolded positions, said overcenter means including a bracket member fixed to the outer boom and offset in the fore-and-aft direction to one side of the pivotal axis when the outer boom is in the unfolded position, said bracket offset to the opposite side of the axis when the outer boom is in the folded position.

2. The invention as set forth in claim 1 wherein the inner and outer booms comprise a pair of complementary A-frames having upright side legs with substantially horizontal upper and lower connecting portions, said A-frames connected to the respective adjacent ends of the booms and pivotally connected together at a pair of adjacent side legs for swinging generally about the axis of one of said side legs.

3. The invention as set forth in claim 2 wherein the support means is connected to one of the connecting portions of the outer boom A-frame.

4. The invention as set forth in claim 3 wherein the bracket member is connected to the upper connecting portion at a point radially offset from the axis.

5. The invention as set forth in claim 2, or 3 wherein said axis of one of said side legs forms an acute angle with respect to a transverse vertical plane intersecting said axis.

6. In a mobile sprayer adapted for forward movement over a field and having a support frame, a foldable spray boom assembly comprising:
   an inner boom connected to the support frame and extending generally transversely to the forward direction;
   an outer boom having inboard and outboard ends;
   first means hingedly connecting the inboard end of the outer boom to the transversely outermost end of the inner boom for rocking the outer boom with respect to the inner boom generally horizontally about an upright axis between an unfolded position wherein the outer boom extends outwardly from the inner boom and a folded position wherein the outer boom extends inwardly toward the support frame adjacent the inner boom;
   an elongated member having first and second ends;
   second means for supporting the first end of the elongated member from the support frame; and
   third means connecting the second end of the member to the inboard end of the outer boom at a position radially offset from the upright axis for supporting the inner and outer booms generally horizontally above the ground in both the folded and unfolded positions and biasing said outer boom toward the folded position as said outer boom approaches said folded position.

7. The invention as set forth in claim 6 wherein the upright axis forms an acute angle with a transverse vertical plane so that as the outer boom is swung from the unfolded position toward the folded position, the outboard end raises relative to the inboard end.

8. The invention as set forth in claim 6 or 7 wherein the elongated member is tensioned between the second and third means and together with the first means forms an overcenter device which biases the outer boom toward the folded or unfolded position as said boom is swung toward said respective positions from an intermediate position.

9. In a mobile sprayer adapted for forward movement over a field and having a support frame, a foldable spray boom assembly comprising:
   an inner boom connected to the support frame and extending generally transversely to the forward direction;
   an outer boom having inboard and outboard ends;
   a hinge structure connected to the inboard end of the outer boom including front and rear upright frame members, and a generally fore-and-aft extending member connecting the upper ends of the upright frame members;
   means pivotally connecting the outer boom to the inner boom for permitting the outer boom to swing between an outwardly extended unfolded position and a folded position adjacent and generally parallel to the inner boom, said means including pivot structure connected between the outboard end of the inner boom and one of the upright frame members and having a generally upright pivotal axis lying generally along said frame member; and support structure connected to the support frame and extending transversely therefrom above the inner boom, including means connecting the support structure to the fore-and-aft extending member of the hinge structure at a location radially offset from the axis of the hinge for supporting the hinge structure above the ground and yieldingly biasing the outer boom about the pivotal axis toward the folded position when said outer boom is in or approaching said folded position.

10. In a mobile sprayer adapted for forward movement over a field and having a support frame, a foldable spray boom assembly comprising:

an inner boom connected to the support frame and extending generally transversely to the forward direction;

an outer boom having inboard and outboard ends;

a hinge assembly pivotally connecting the inboard end of the outer boom to the outermost end of the inner boom, said hinge assembly comprising a first hinge portion connected to the inner boom and a second hinge portion connected to the first hinge portion by a pivot having a generally upright pivotal axis, wherein said second hinge portion is connected to the inboard end of the outer boom and includes a structural member offset radially from the pivotal axis; and elongated tension link means extending outwardly from the support frame and pivotally connected to the structural member for supporting the inner and outer booms above the ground, wherein when the outer boom is in or approaching the folded position, the tension link at its connection with the structural member is offset fore-and-aft from the pivotal axis to bias the outer boom toward the folded position.

11. In a mobile sprayer adapted for forward movement over a field and having a support frame, a spray boom assembly comprising:

an inner boom and an outer boom, each said boom having inboard and outboard ends;

means for mounting the inboard end of the inner boom on the boom support frame;

hinge means pivotally connecting the outboard end of the inner boom to the inboard end of the outer boom for rocking the outer boom about a substantially upright axis between preselected positions including a generally outwardly extending, unfolded position and an inwardly extending, folded position;

elongated support means extending above the inner boom connected to the outer boom adjacent the hinge means and to the support frame and tensioned therebetween for providing vertical stability to the inner and outer booms when the latter is in either its folded or unfolded position; and wherein the inner and outer booms comprise a pair of complementary A-frames having upright side legs with substantially horizontal upper and lower connecting portions, said A-frames connected to the respective adjacent ends of the booms and pivotally connected together at a pair of adjacent side legs for swinging generally about the axis of one of said side legs.

12. The invention as set forth in claim 11 further comprising overcenter means connecting the support means to the outer boom for biasing the outer boom towards the unfolded position when it is within a range of positions between the unfolded position and an intermediate position between said folded and unfolded positions.

13. The invention as set forth in claim 11 or 12 wherein the support means is connected to one of the connecting portions of the outer boom A-frame.

14. The invention as set forth in claim 13 wherein the support means is connected to the connecting portion at a point radially offset from the axis for biasing the outer boom toward a preselected position.

15. The invention as set forth in claim 11 wherein said axis of one of said side legs forms an acute angle with respect to a transverse vertical plane intersecting said axis.

* * * * *